(12) United States Patent
Pan

(10) Patent No.: US 6,700,481 B2
(45) Date of Patent: Mar. 2, 2004

(54) CAR AIRFOIL LIGHTING DISPLAY

(75) Inventor: Chi-Hsiang Pan, Taipei (TW)

(73) Assignee: Pro-Plus Inc., Tucheng (TW)

( * ) Notice: Subject to any disclaimer, the term of this patent is extended or adjusted under 35 U.S.C. 154(b) by 142 days.

(21) Appl. No.: 10/053,592

(22) Filed: Jan. 24, 2002

(65) Prior Publication Data
US 2003/0137412 A1 Jul. 24, 2003

(51) Int. Cl.[7] .............................. B06Q 1/22; B06Q 1/26
(52) U.S. Cl. .................... 340/463; 340/468; 340/475; 362/496
(58) Field of Search ................... 340/463, 465, 340/468, 475, 478, 483, 815; 362/496, 498, 541, 555; 307/9, 10

(56) References Cited

U.S. PATENT DOCUMENTS 5,258,893 A * 11/1993 Finneyfrock ................ 362/485
5,560,701 A * 10/1996 Payne ......................... 362/493
5,988,839 A * 11/1999 Pokorney et al. ........... 362/493

FOREIGN PATENT DOCUMENTS

JP 61-160328 * 12/1984

* cited by examiner

*Primary Examiner*—Jeffery Hofsass
*Assistant Examiner*—Jennifer Stone
(74) *Attorney, Agent, or Firm*—Leong C. Lei

(57) ABSTRACT

A car airfoil light display to improve drive safety, comprised of two hollow light holders respectively secured to both ends of the airfoil, each light holder having an approximately conic head, a hexagonal retainer, and a threaded rod section extending for a proper length from the lower end of the retainer; a light emission device containing a conductor being inserted into the conic head, and the rod section being inserted through a hole in a flap of the airfoil and secured to the airfoil; the conductor being connected to a cornering light of the car to execute synchronous one-sided or two-sided flare with one cornering light on the same side or both cornering lights when the car is taking a turn or attempting to park.

3 Claims, 5 Drawing Sheets

CAR AIRFOIL LIGHTING DISPLAY

BACKGROUND OF THE INVENTION (a) Field of the Invention

The present invention is related to a car airfoil lighting display, and more particularly, to one that is mounted to an airfoil of a car to have one-sided or two-sided flare synchronously with one or two cornering lights of the car to improve drive safety.

(b) Description of the Prior Art

When a driver attempts to take a turn, he turns on the cornering light to warn the approaching and following vehicles. To this purpose, the cornering lights are usually provided to the both sides of the headlight and the taillight. However, the cornering lights are not necessarily easily visible to the approaching car or pedestrian from sideways. As a result, car accident takes place due to misjudgment of the vision.

SUMMARY OF THE INVENTION

The present invention is related to a car airfoil lighting display, and more particularly, to one that is mounted to an airfoil of a car to have one-sided or two-sided flare synchronously with one or two cornering lights of the car to improve drive safety.

The primary purpose of the present invention is to provide a light display mounted to an airfoil of a car. When the car is taking a turn or attempting to park, the light display has one-sided or two-sided synchronous flare to warn approaching vehicle or pedestrian, particularly from sideways to improve drive safety.

To achieve the purpose, a hollow light holder comprised of an approximately conic head, a hexagonal retainer, and a threaded rod section extending for a proper length from the lower end of the retainer. A light emission device containing a conductor is inserted into the conic head, and the rod section is inserted through a hole in a flap of the airfoil and secured to the airfoil. The conductor is connected to a cornering light of the car to execute synchronous one-sided or two-sided flare with one cornering light on the same side or both cornering lights when the car is taking a turn or attempting to park.

The inner edges of the retainer and the conic head of the light holder indicate a tapered surface to form a stopper for the light emission device The light emission device inserted to the light holder is a bulb or a light emission diode.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
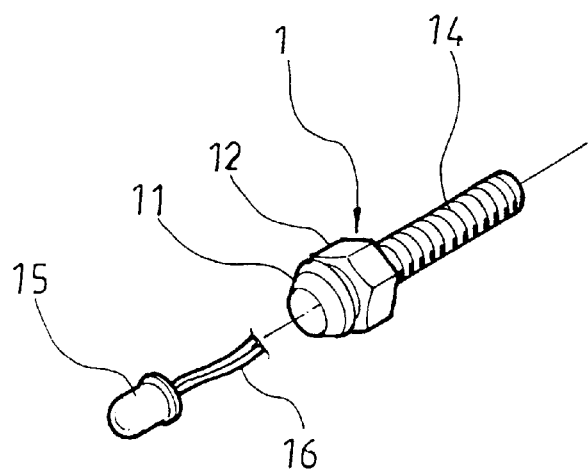
FIG. 1 is a perspective view of a preferred embodiment of the present invention.
Figure 2:
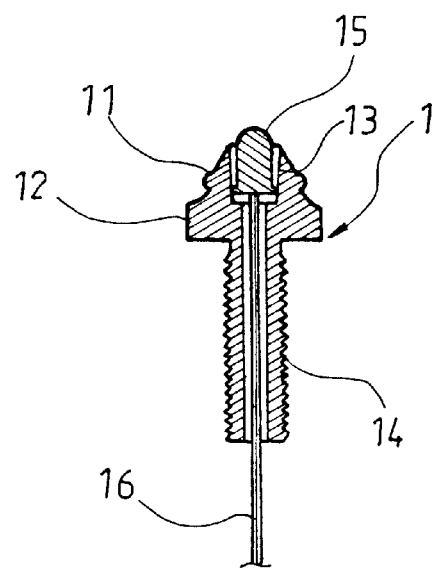
FIG. 2 is a sectional view of the preferred embodiment of the present invention.
Figure 3:
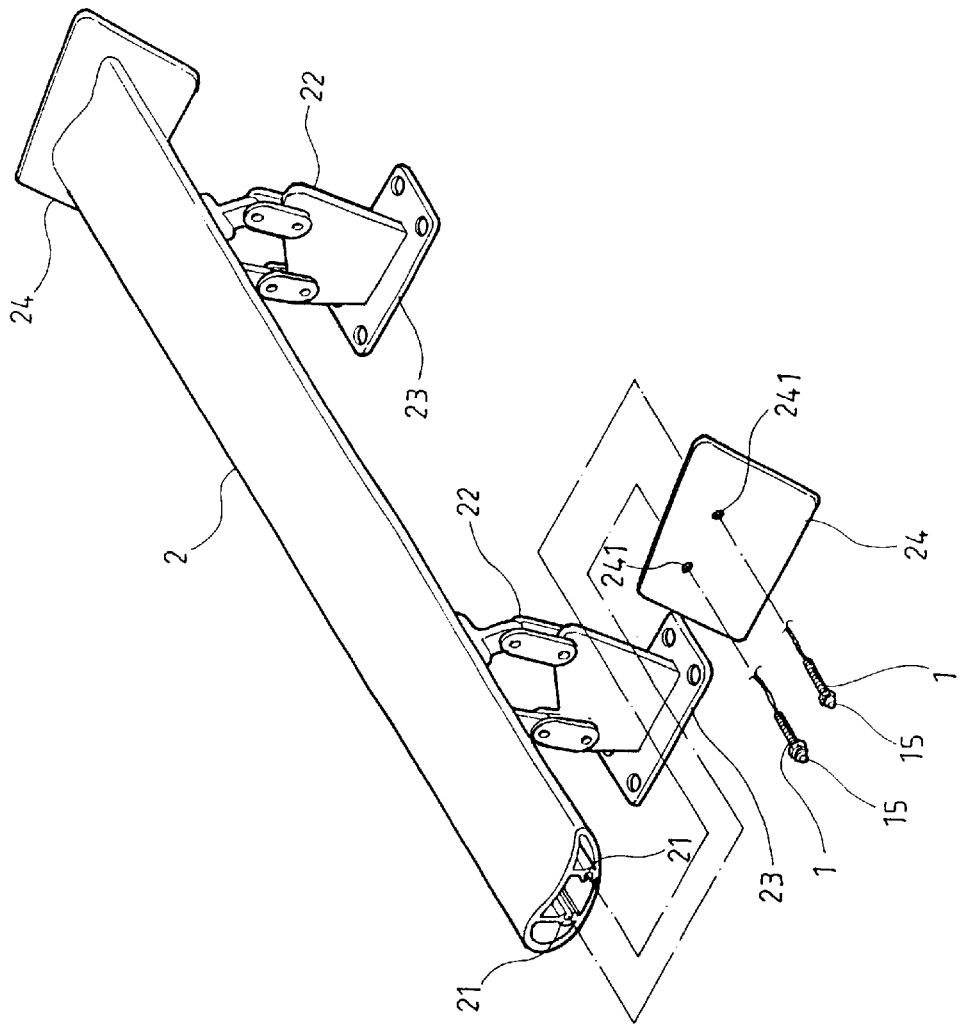
FIG. 3 is a schematic view showing that the preferred embodiment is mounted to an airfoil.

Referring to FIGS. 1, 2 and 3, the present invention is essentially comprised of a hollow light holder 1, a light emission device 15 and an airfoil 2. Within said light holder 1 has an approximately conic head 11 and a hexagonal retainer 12 being provided at the top edge of the light holder 1. Inner edges of both of the conic head 11 and the hexagonal retainer 12 indicate a tapered surface 13. A threaded rod section 14 extends for a proper length from the lower part of the retainer 12.

The light emission device 15, related to a bulb or LED is connected to a conductor 16, then inserted to the conic head 11 of the light holder 1 to expose the conductor 16 from the threaded rod section 14 of the light holder 1.

The airfoil 2 has at its two cross sections respectively provided with a symmetrical bolt 21, and an elevation adjustment 22 being disposed beneath the airfoil 2. A fixation plate 23 connects said elevation adjustment 22 to the body of the car, and a flap 24 each is provided to both sides of the airfoil 2 having a hole 241 corresponding to the bolt 21.

The rod section 14 of the light holder 1 is first inserted through the hole 241 in the flap 24, then is engaged with the bolt 21 of the airfoil 2 by turning the retainer 12 with a tool (hexagonal wrench or socket wrench) so to secure the light holder 1 to the flap 24. The conductor 16 passes through the airfoil 2 and the body of the car to be connected to the source for the cornering light for the light emission device 15 to have simultaneously one-sided or two-sided flare when the cornering light is turned on when the car is driving or attempting to park to improve drive safety.

Figure 4:
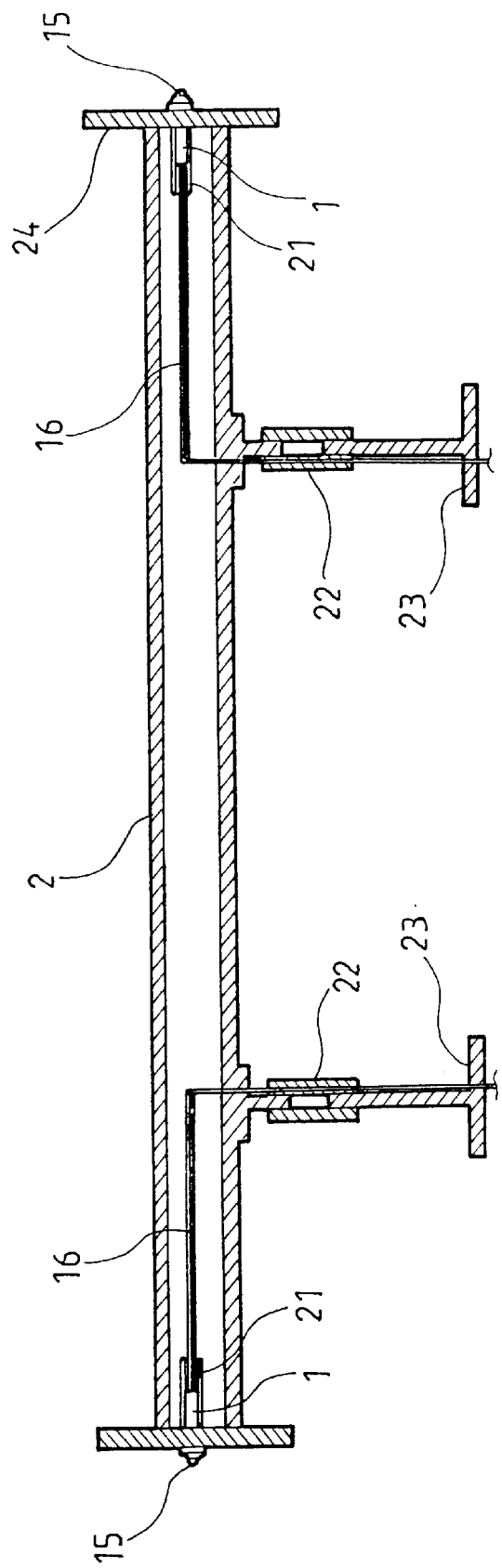
FIG. 4 is a sectional view showing an assembly of the preferred embodiment of the present invention.
Figure 5:
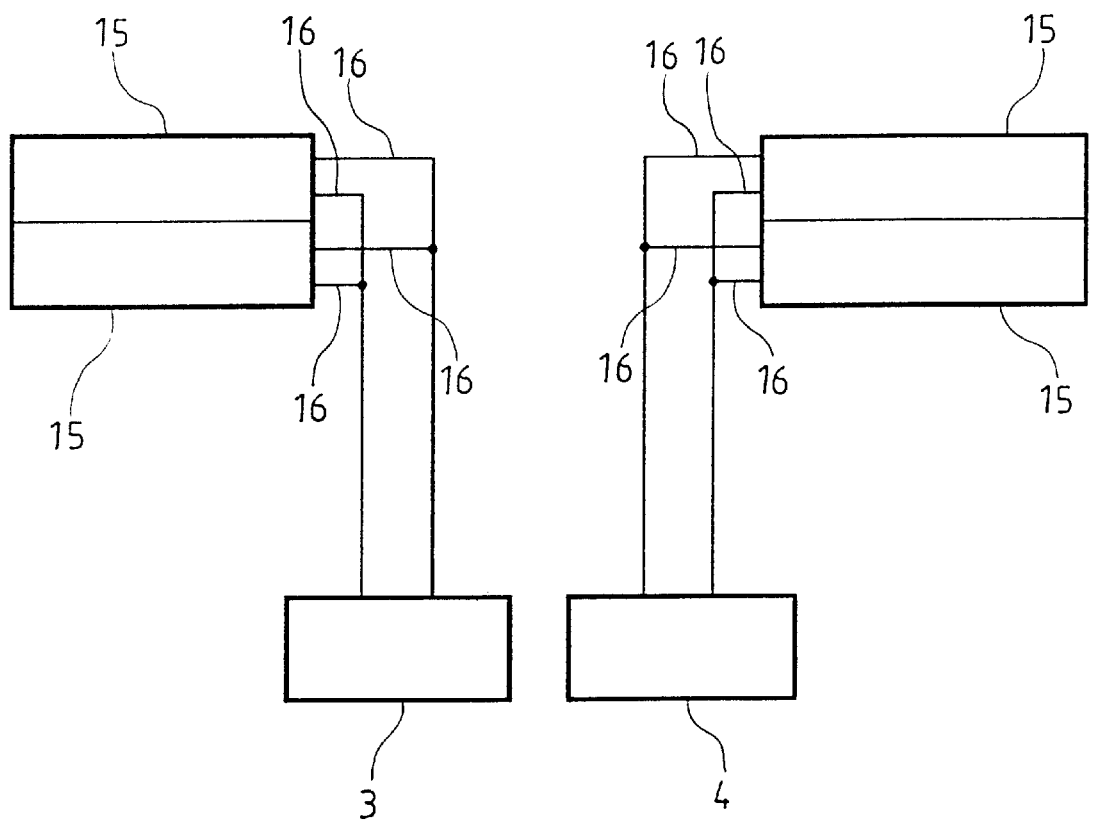
FIG. 5 is a wiring diagram of the preferred embodiment of the present invention.

As illustrated in FIGS. 4 and 5, the light holder is each provided to both sides of the airfoil 2. Both conductors 16 from the light holders 1 are inserted through the airfoil 2 and connected in parallel before being respectively connected to the LH and RH corning lights 3 and 4. While the car is driving and either corning light 3 or 4 is turned on, the light emission device 15 on the same side of the corning light 3 or 4 that is turned on flares. Upon parking the car, both of said corning lights 3 and 4 are turned on, and both of the light emission devices also flare at the same time.

Figure 6:
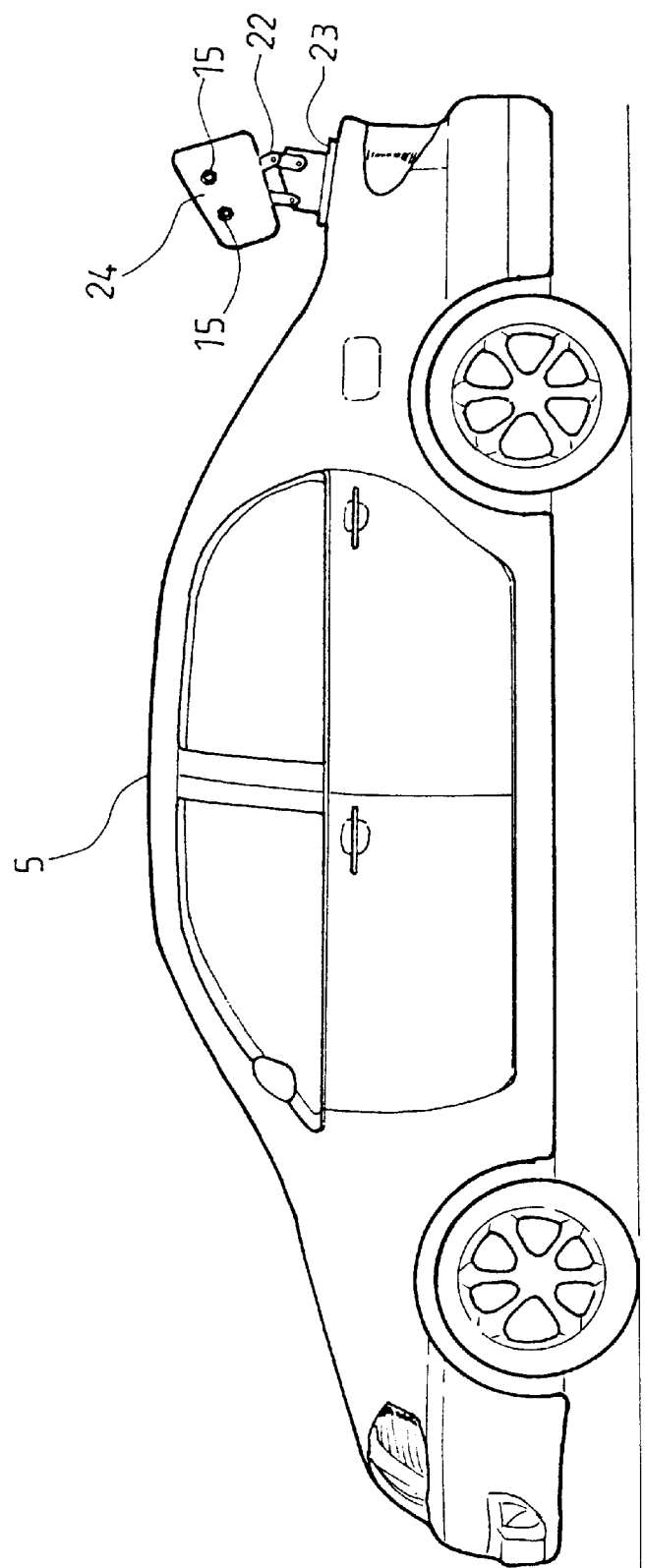
FIG. 6 is a schematic view showing that the preferred embodiment of the present invention is mounted to a car.

Now referred to FIG. 6, the present invention is mounted to the airfoil 2 of a car 5. Within, the airfoil 2 is mounted over the rear trunk of the car 5 and the light emission devices 15 mounted to both sides of the flaps 24 of the airfoil 2 can be clearly sighted by the side mirrors of the car 5. Upon turning or attempting a parking of the car 5, one or both of the light emission device 15 flares or flare as the secondary warning to improve drive safety.

The present invention providing synchronous light display with a corning light of a car by means of a threaded light holder containing a light emission device fixed to each flap of an airfoil mounted to the car is an innovative and practical design to improve drive safety. Therefore, this application for a utility pattern is duly filed accordingly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A car airfoil light display to improve drive safety, essentially comprised of two hollow light holders respectively secured to both ends of the airfoil, each light holder having an approximately conic head, a hexagonal retainer, and a threaded rod section extending for a proper length from the lower end of the retainer; a light emission device containing a conductor being inserted into the conic head, and the rod section being inserted through a hole in a flap of the airfoil and secured to the airfoil; the conductor being connected to a cornering light of the car can be executed on either the left or the right side or both, simultaneously, to provide one or two-sided flare.

2. A car airfoil light display as claimed in claim 1, wherein the inner edges of the retainer and the conic head of the light holder indicate a tapered surface to form a stopper for the light emission device.

3. A car airfoil light display as claimed in claim 1, wherein the light emission device inserted to the light holder is a bulb or a light emission diode.

* * * * *